(12) United States Patent
Yin et al.

(10) Patent No.: US 9,227,795 B2
(45) Date of Patent: Jan. 5, 2016

(54) WORKPIECES SEPARATING DEVICE

(71) Applicants: SHENZHEN FUTAIHONG PRECISION INDUSTRY CO., LTD., Shenzhen (CN); FIH (Hong Kong) Limited, Kowloon (HK)

(72) Inventors: Mao-Yi Yin, Shenzhen (CN); Jian-Ping Jin, Shenzhen (CN); Bing Yu, Shenzhen (CN)

(73) Assignees: SHENZHEN FUTAIHONG PRECISION INDUSTRY CO., LTD., Shenzhen (CN); FIH (Hong Kong) Limited, Kowloon (HK)

( * ) Notice: Subject to any disclaimer, the term of this patent is extended or adjusted under 35 U.S.C. 154(b) by 243 days.

(21) Appl. No.: 13/951,756

(22) Filed: Jul. 26, 2013

(65) Prior Publication Data

US 2014/0182102 A1 Jul. 3, 2014

(30) Foreign Application Priority Data

Dec. 29, 2012 (CN) .......................... 2012 1 0588841

(51) Int. Cl.
| | |
|---|---|
| *B65G 47/26* | (2006.01) |
| *B23P 19/04* | (2006.01) |
| *B65G 47/28* | (2006.01) |
| *B65G 33/02* | (2006.01) |
| *B65G 33/04* | (2006.01) |

(52) U.S. Cl.
CPC ................. *B65G 47/26* (2013.01); *B23P 19/04* (2013.01); *B65G 33/02* (2013.01); *B65G 33/04* (2013.01); *B65G 47/28* (2013.01); *Y10T 29/53683* (2015.01)

(58) Field of Classification Search
CPC ........ B65G 47/26; B65G 47/28; B65G 33/02; B65G 33/04
USPC .......... 198/459.1, 459.3, 459.4, 468.3, 468.9, 198/474.1
See application file for complete search history.

(56) References Cited

U.S. PATENT DOCUMENTS

| | | | | |
|---|---|---|---|---|
| 6,000,901 | A  * | 12/1999 | Fierkens ................... | 414/416.09 |
| 6,787,096 | B2 * | 9/2004 | Boscaratto et al. ........... | 264/535 |
| 7,464,807 | B2 * | 12/2008 | Ham et al. ................. | 198/468.3 |
| 7,985,065 | B2 * | 7/2011 | Lo et al. ........................ | 425/534 |
| 8,033,381 | B2 * | 10/2011 | Konstandin et al. .......... | 198/458 |

* cited by examiner

*Primary Examiner* — Leslie A Nicholson, III
(74) *Attorney, Agent, or Firm* — Novak Druce Connolly Bove + Quigg LLP

(57) ABSTRACT

A separating device for separating workpieces includes a driving unit, a supporting board, and a moving assembly. The supporting board defines a number of sliding grooves spaced from each other. The moving assembly includes a sliding board slidably assembled to the supporting board, and a plurality of first moving blocks for holding workpieces. The sliding board slides along a first direction and defines two latching holes, each extending along a second direction perpendicular to the first direction. Each of the first moving blocks extends through the latching holes to be inserted in one of the sliding grooves. The driving unit drives the sliding board to slide along the first direction. The sliding board forces the number of first moving blocks to slide along the number of sliding grooves.

17 Claims, 5 Drawing Sheets

WORKPIECES SEPARATING DEVICE

BACKGROUND

1. Technical Field

The present disclosure generally relates to devices for separating workpieces.

2. Description of related art

Electronic devices (such as mobile phones) comprise many workpieces. During an assembling process of the electronic devices, the workpieces need to be evenly spaced apart from each other to facilitate assembly. However, devices for separating workpieces can not always effectively or rapidly separate the workpieces.

Therefore, there is room for improvement within the art.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
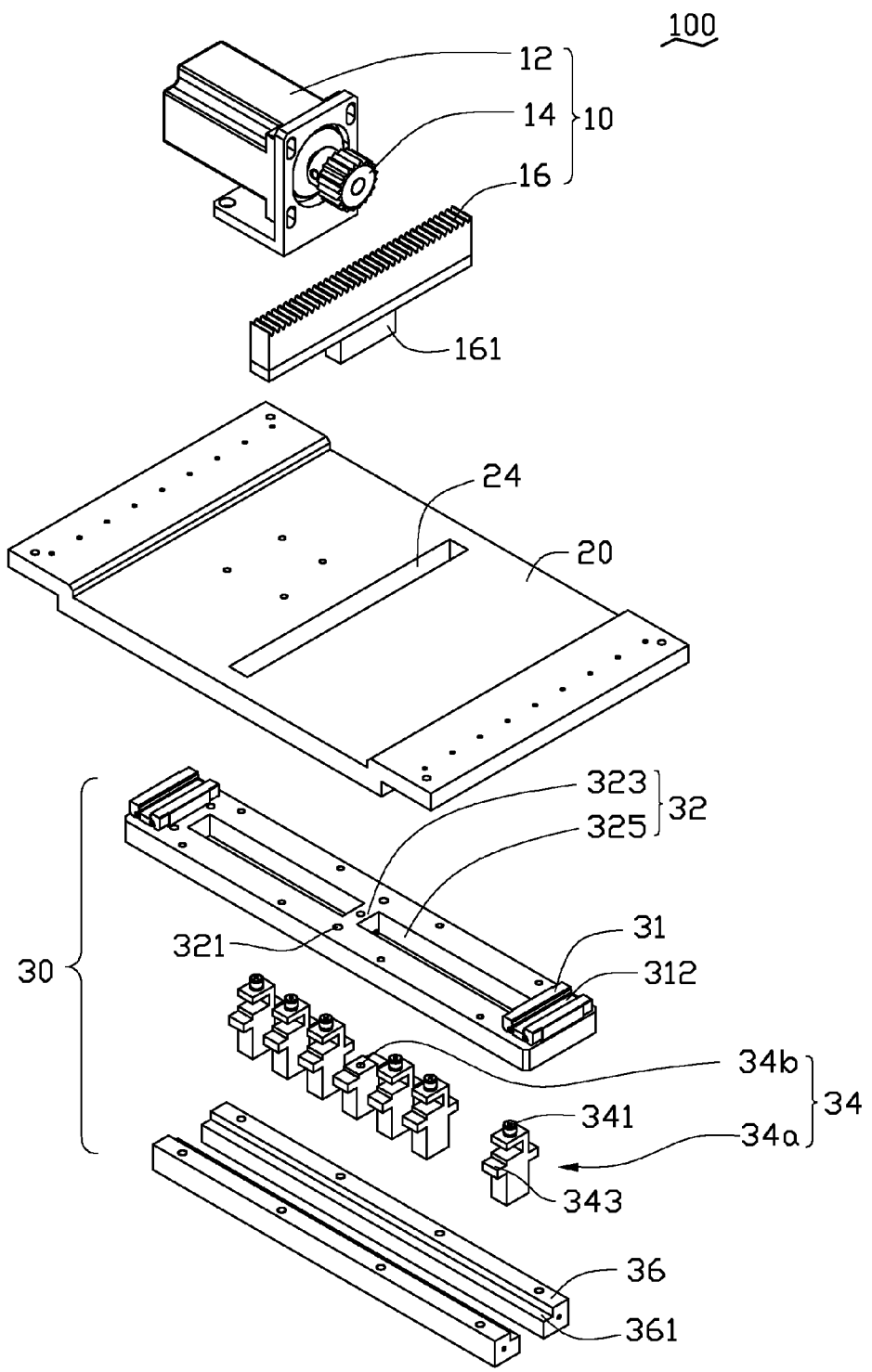
FIG. 1 is an exploded view of a workpieces separating device in accordance with an exemplary embodiment.
Figure 2:
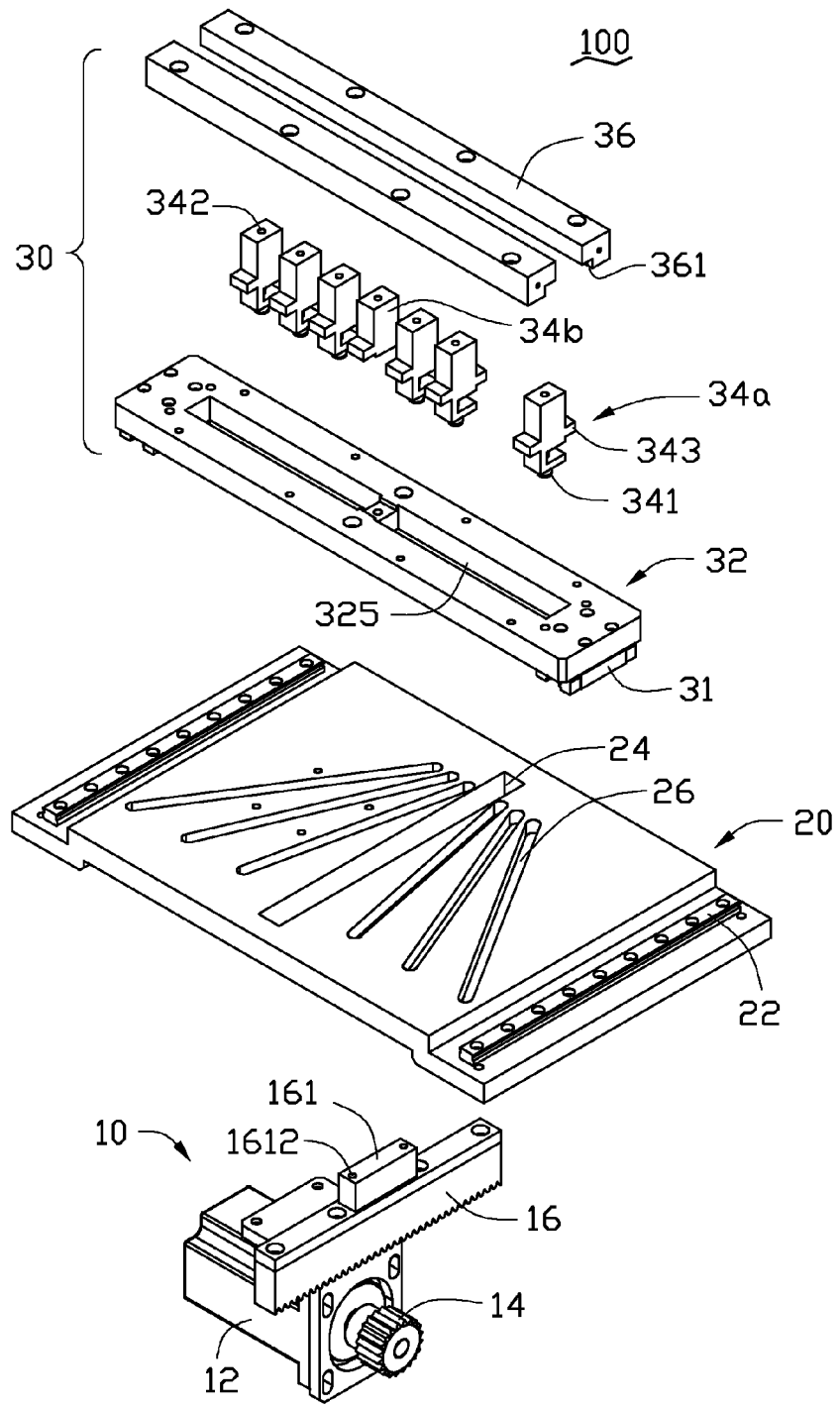
FIG. 2 is an exploded view of the workpieces separating device of FIG. 1 viewed from another angle.

FIGS. 1 and 2 show an exemplary embodiment of a separating device 100, which includes a driving unit 10, a supporting board 20, and a moving assembly 30.

The driving unit 10 includes a driver 12, a gear 14 driven by the driver 12, and a rack 16 engaging with the gear 14. The driver 12 can be a motor, for example, and is attached to the supporting board 20. The rack 16 is slidably assembled to the supporting board 20. The driver 12 drives the gear 14 to rotate, thereby driving the rack 16 to slide relative to the supporting board 20. The rack 16 includes a fastening portion 161. The fastening portion 161 defines two first threaded holes 1612. The fastening portion 161 is connected to the moving assembly 30

The supporting board 20 is substantially rectangular. Two sliding rails 22 are attached to a first surface of the supporting board 20 and are located at two ends of the supporting board 20. The two sliding rails 22 are substantially parallel to each other. The supporting board 20 defines a through hole 24 and a plurality of sliding grooves 26. The through hole 24 extends along a direction substantially parallel to the two sliding rails 22. The direction parallel to the two sliding rails 22 is defined as a first direction. The fastening portion 161 of the rack 16 extends through the through hole 24 from a second surface of the supporting board 20 opposite to the first surface, to be attached to the moving assembly 30 and slide in the through hole 24 along the first direction. When the rack 16 is driven to move, the fastening portion 161 slides in the through hole 24 to move the rack 16 and the moving assembly 30.

The plurality of sliding grooves 26 are symmetrically located at two sides of the through hole 24 and are defined in the first surface of the supporting board 20. In this embodiment, each side of the through hole 24 has three sliding grooves 26. Each sliding grooves 26 extends at an angle relative to the through hole 24. The sliding grooves 26 and the through hole 24 are evenly spaced apart from each other. Angles formed between the through hole 24 and the two adjacent sliding grooves 26, as well as angles formed between two adjacent sliding grooves 26, are substantially the same. A direction perpendicular to the through hole 24 is defined as a second direction. That is, a distance between each two adjacent sliding grooves 26 and a distance between the through hole 24 and the two adjacent sliding grooves 26 along the second direction increases linearly from a first end of the sliding grooves 26 to an opposite second end of the sliding grooves 26, or decreases linearly from the second end of the sliding grooves 26 to the first end of the sliding grooves 26.

The moving assembly 30 includes two sliding blocks 31, a sliding board 32, a plurality of moving blocks 34, and two fastening bars 36.

Each sliding block 31 defines a sliding recess 312. The two sliding blocks 31 are attached to two ends of the sliding board 32. Each sliding rail 22 of the supporting board 20 is slidably received in a corresponding sliding recess 312, thereby enabling the sliding board 32 to slide relative to the supporting board 20. The sliding board 32 is attached to the fastening portion 161 of the rack 16 to allow the rack 16 to drive the sliding board 32 to slide. In the exemplary embodiment, the sliding board 32 defines two spaced second threaded hole 321 corresponding to the two first threaded holes 1612 of the rack 16. The first and second threaded holes 1612, 321 are configured for receiving screws therein, thereby securing the sliding board 32 to the rack 16. The sliding board 32 defines two spaced latching holes 325, thereby forming a fixing portion 323 between the two latching holes 325. The two second threaded holes 321 are defined in the fixing portion 323. Each latching hole 325 is a through hole and extends along a direction substantially perpendicular to the through hole 24. Each latching hole 325 has a length long enough not to limit the movement of the moving blocks 34.

The moving blocks 34 include a plurality of first moving blocks 34a and a second moving block 34b. A number of the plurality of first moving blocks 34a is the same as a number of the sliding grooves 26. Each first moving block 34a has a roller 341 attached to an end thereof. The first moving blocks 34a extend through the latching holes 325, with the roller 341 of each first moving block 34a slidably received in one of the sliding grooves 26, such that the first moving blocks 34a are capable of sliding along the sliding grooves 26. The second moving block 34b is secured to the fixing portion 323. An opposite end of each moving block 34 has a mechanism 342 for holding workpieces 200 to be separated. The mechanism can be a vacuum grip device, for example. Each moving block 34 has a flange 343 protruding from opposite sides.

Each fastening bar 36 defines a latching recess 361. The two fastening bars 36 are attached to the sliding board 32 with the moving blocks 34 located between the two fastening bars 36. The flanges 343 of the moving blocks 34 extend in the latching recesses 361 for latching the moving blocks 34 in the two fastening bars 36 and ensuring that the rollers 341 slide in the sliding grooves 26.

Figure 3:
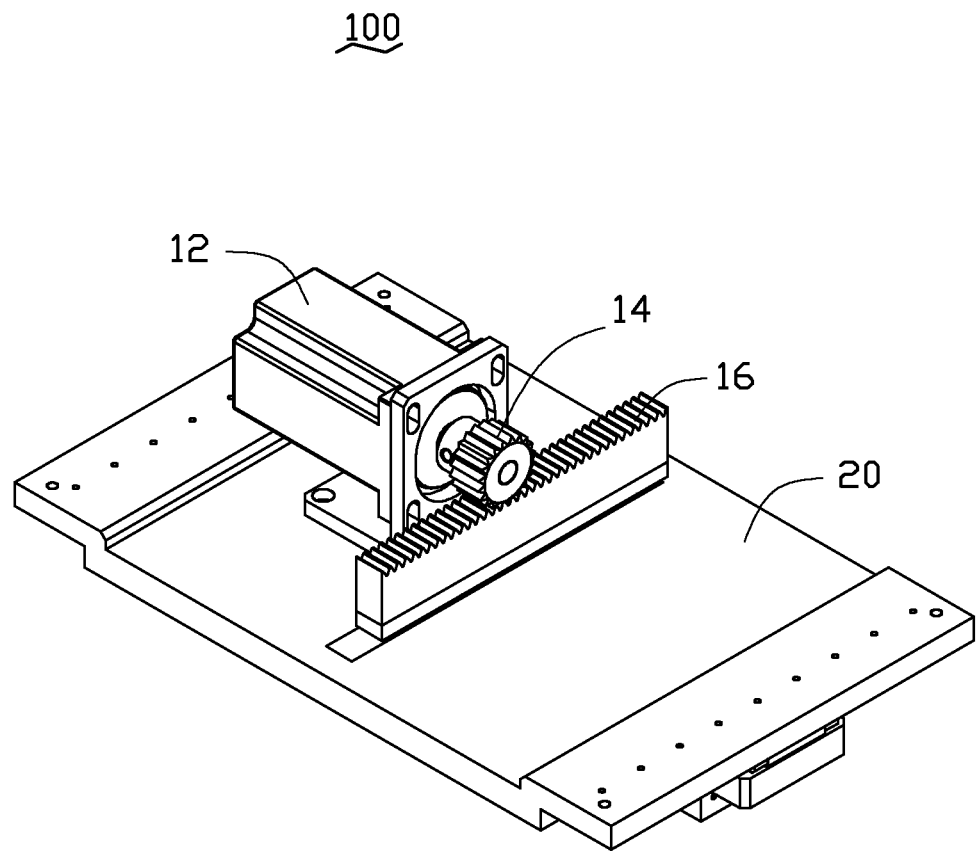
FIG. 3 is an isometric assembled view of the workpieces separating device of FIG. 1.
Figure 4:
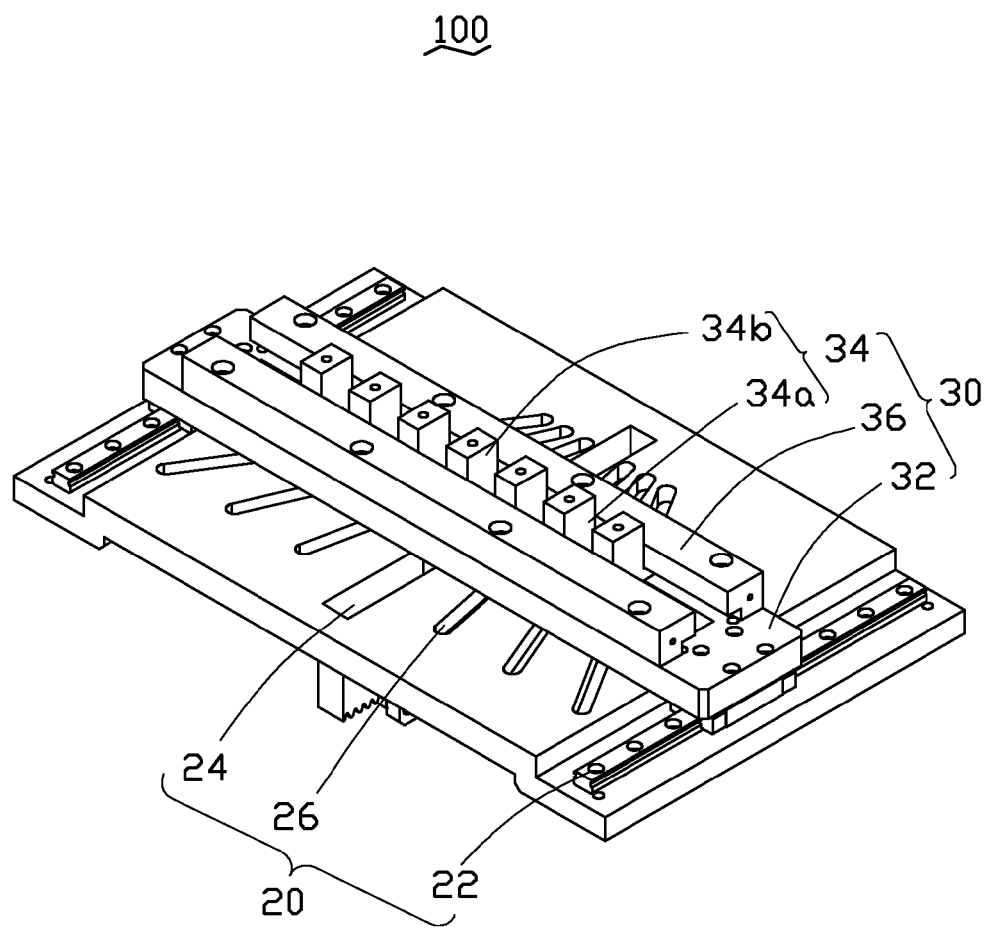
FIG. 4 is an isometric assembled view of the workpieces separating device of FIG. 3 viewed from another angle.
Figure 5:
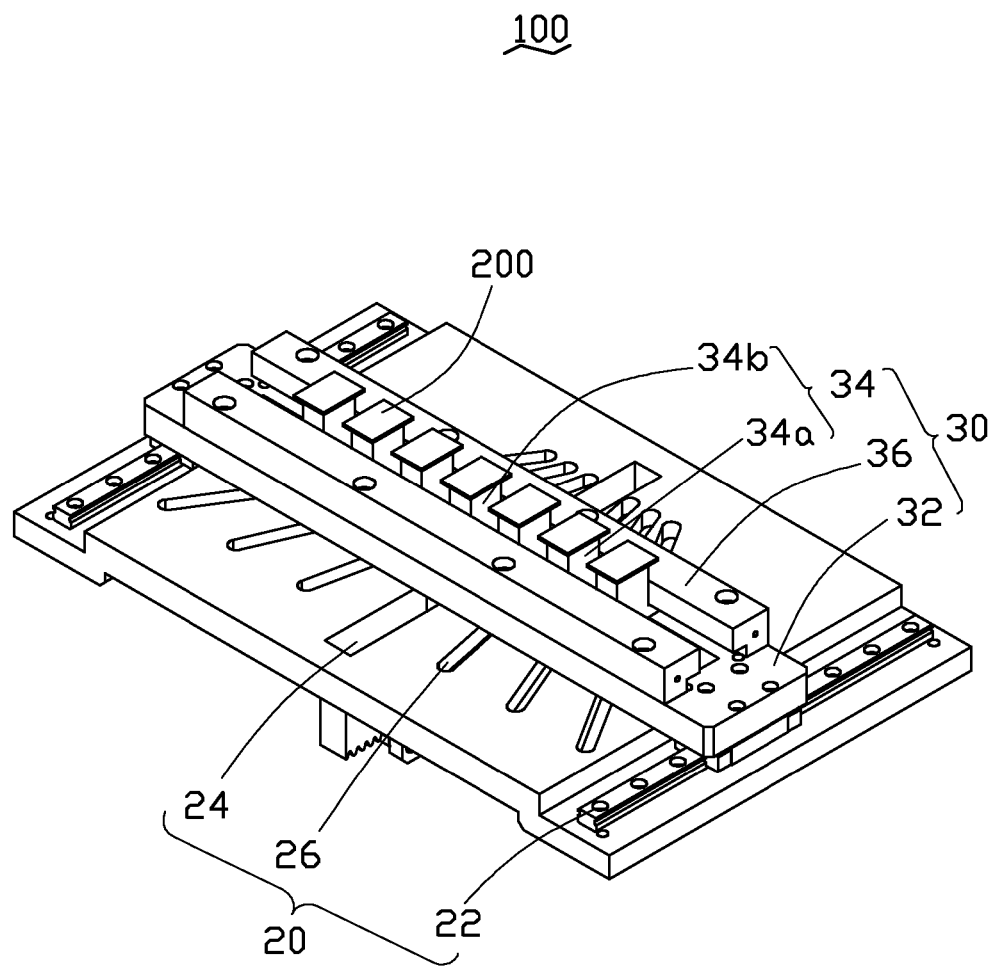
FIG. 5 is an isometric assembled view of the workpieces separating device of FIG. 4, in a state of separating workpieces.

In use, referring to FIGS. 3-5, the driver 12 drives the rack 16 to move along the through hole 24, thereby driving the sliding board 32 to slide along the slide rails 22 of the supporting board 20. The sliding board 32 causes the first moving blocks 34a to move, with the rollers 341 sliding in the sliding grooves 26. Thus, the first moving blocks 34a move along the sliding grooves 26. The second moving block 34b moves along the through hole 24. Meanwhile, the first moving blocks 34a slide along the latching holes 325 while the sliding board 32 moves. Because the sliding grooves 26 and the through hole 24 are evenly spaced apart from each other, and adjacent sliding grooves 26 have substantially the same angle between each other, moving distances of each moving block 34 are substantially equivalent throughout the movement of the moving blocks 34. Thus, the workpieces 200 held on the moving blocks 34 are evenly spaced.

In other embodiments, the second moving block 34b can be omitted and just use the first moving blocks 34a to hold workpieces as long as adjacent sliding grooves 26 have substantially the same angle between each other.

In other embodiments, the plurality of sliding grooves 26 may be other shapes or sizes, or other guiding mechanism for guiding the first moving block 34a to move along the first direction. Such a guiding mechanism is defined as a first guiding mechanism. For example, a number of the sliding grooves 26 may be more or less, and the sliding grooves 26 may be spaced differently according to the workpieces. The plurality of sliding grooves 26 may be arcuate, as long as the workpieces are separated from each other when the first moving blocks 34a slide along the sliding grooves 26. Additionally, the two latching holes 325 may also be other shapes or sizes, or other guiding mechanism for guiding first moving blocks 34a to move along the second direction perpendicular to the first direction when the first moving blocks 34a are forced to move along the first guiding mechanism. Such a guiding mechanism is defined as a second guiding mechanism. For example, a number of the latching holes 325 may be more or less, and the latching holes 325 may be spaced differently, according to the workpieces.

It is to be understood, however, that even through numerous characteristics and advantages of the present disclosure have been set forth in the foregoing description, together with details of assembly and function, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A device for separating workpieces, the separating device comprising:
   a driving unit;
   a supporting board defining a plurality of sliding grooves spaced from each other; and
   a moving assembly comprising:
      a sliding board slidably assembled to the supporting board, the sliding board being capable of sliding along a first direction and defining two latching holes each extending along a second direction perpendicular to the first direction; and
      a plurality of first moving blocks for holding workpieces, each of the plurality of first moving blocks extending through the two latching holes to be inserted in one of the plurality of sliding grooves;
   wherein the driving unit drives the sliding board to slide along the first direction, the sliding board forces the plurality of first moving blocks to slide along the plurality of sliding grooves; and
   wherein the supporting board defines a through hole; the drive unit comprises a driver, a gear driven by the driver, and rack engaging with the gear; the rack comprises a fastening portion; the fastening portion extends through the through hole to be attached to the sliding board and slide along the through hole, thereby driving the sliding board to slide along the through hole.

2. The device as claimed in claim 1, wherein each of the plurality of sliding grooves extends at an angle relative to the first direction; the plurality of sliding grooves are evenly spaced apart from each other; and the angles formed between two adjacent sliding grooves are substantially the same.

3. The device as claimed in claim 1, wherein the distance between each two adjacent sliding grooves along the second direction, increases linearly from a first end of the sliding grooves to an opposite second end of the sliding grooves.

4. The device as claimed in claim 1, wherein the through hole extends along the first direction; the plurality of sliding grooves are symmetrically located at two sides of the through hole.

5. The device as claimed in claim 1, wherein the moving assembly further comprises two fastening bars each defining a latching recess; each of the plurality of first moving blocks has two flanges protruding from two sides; the two fastening bars are attached to the sliding board with the plurality of first moving blocks located between the two fastening bars; the flanges extend in the latching recesses to be latched in the latching recesses.

6. The device as claimed in claim 1, wherein each of the plurality of first moving block has a roller attached to an end thereof; the roller of each of the plurality of first moving block slidably received in one of the of the plurality of sliding grooves.

7. The device as claimed in claim 1, wherein the moving assembly further comprises a second moving block; the second moving block is attached to the sliding board; the plurality of first moving blocks are symmetrically arranged at two sides of the second moving block.

8. The device as claimed in claim 1, wherein the supporting board has two sliding rails; the moving assembly comprises two sliding blocks each defining a sliding recess; the two sliding blocks are attached to the sliding board; each of the sliding rails is slidably received in one of the sliding recesses.

9. A device for separating workpieces, the device comprising:
   a driving unit;
   a supporting board having a first guiding mechanism; and
   a moving assembly comprising:
      a sliding board having a second guiding mechanism, the sliding board slidably assembled to the supporting board and being capable of sliding along a first direction driven by the driving unit; and
      a plurality of first moving blocks for holding workpieces;
   wherein with the sliding board sliding along a first direction, the plurality of first moving blocks is guided by the first guiding mechanism and the second guided mechanism to slide along the first direction and a second direction perpendicular to the first direction, thus to separating the plurality of first moving blocks; and
   wherein the supporting board defines a through hole; the drive unit comprises a driver, a gear driven by the driver, and rack engaging with the gear; the rack comprises a fastening portion; the fastening portion extends through the through hole to be attached to the sliding board and slide along the through hole, thereby driving the sliding board to slide along the through hole.

10. The device as claimed in claim 9, wherein the first guiding mechanism is a plurality of sliding grooves spaced from each other defined in the supporting board.

11. The device as claimed in claim 10, wherein the second guiding mechanism is two latching holes extending along the second direction and defined in the sliding board, the plurality of first moving blocks extend through the two latching holes to be inserted in one of the plurality of sliding grooves.

12. The device as claimed in claim 10, wherein each of the plurality of sliding grooves extends at an angle to the first direction; the plurality of sliding grooves are evenly spaced apart from each other; and the angles formed between two adjacent sliding grooves are the same.

13. The device as claimed in claim 12, wherein the distance between each two adjacent sliding grooves along the second direction, increases linearly from a first end of the sliding grooves to an opposite second end of the sliding grooves.

14. The device as claimed in claim 9, wherein the through hole extends along the first direction; the plurality of sliding grooves are symmetrically located at two sides of the through hole.

15. The device as claimed in claim 9, wherein the moving assembly further comprises two fastening bars each defining a latching recess; each of the plurality of first moving blocks has two flanges protruding from two sides; the two fastening bars are attached to the sliding board with the plurality of first moving blocks located between the two fastening bars; the flanges extend in the latching recesses to be latched in the latching recesses.

16. The device as claimed in claim 10, wherein each of the plurality of first moving block has a roller attached to an end thereof; the roller of each of the plurality of first moving block slidably received in one of the of the plurality of sliding grooves.

17. The device as claimed in claim 9, wherein the supporting board has two sliding rails; the moving assembly comprises two sliding blocks each defining a sliding recess; the two sliding blocks are attached to the sliding board; each of the sliding rails is slidably received in one of the sliding recesses.

\* \* \* \* \*